(12) United States Patent
Cho et al.

(10) Patent No.: US 8,269,404 B2
(45) Date of Patent: Sep. 18, 2012

(54) EXTERNAL LIGHT BLOCKING FILM FOR DISPLAY DEVICE AND FILTER HAVING THE SAME

(75) Inventors: Eun-Young Cho, ChungCheongNam-Do (KR); Nam Heui Lee, ChungCheongNam-Do (KR); In Sung Sohn, ChungCheongNam-Do (KR); Duck Ki Ahn, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 892 days.

(21) Appl. No.: 12/262,642

(22) Filed: Oct. 31, 2008

(65) Prior Publication Data

US 2009/0116249 A1 May 7, 2009

(30) Foreign Application Priority Data

Nov. 1, 2007 (KR) .................. 10-2007-0111196

(51) Int. Cl.
*H01J 5/16* (2006.01)
(52) U.S. Cl. ........................ 313/112; 313/582
(58) Field of Classification Search .......... 313/582–587, 313/112
See application file for complete search history.

(56) References Cited

U.S. PATENT DOCUMENTS

| 5,835,276 A | 11/1998 | Asai et al. |
| 2006/0250064 A1* | 11/2006 | Park et al. ............... 313/112 |
| 2007/0152555 A1 | 7/2007 | Park et al. |
| 2008/0042569 A1* | 2/2008 | Cha et al. ............... 313/582 |

FOREIGN PATENT DOCUMENTS

| CN | 1996064 A | 7/2007 |
| KR | 20070025942 A | 3/2007 |

OTHER PUBLICATIONS

Office Action from Corresponding Chinese Application No. 200810175524, dated Nov. 27, 2009 which claims priority to Korean Application No. 10-2007-0111196.

* cited by examiner

*Primary Examiner* — Anne Hines
(74) *Attorney, Agent, or Firm* — Lerner, David, Littenberg, Krumholz & Mentlik, LLP (57) ABSTRACT

An external light blocking film includes a base of transparent resin and an external light blocking pattern having a plurality of external light blocking parts. The external light blocking part is formed by filling a groove with a light absorption material. One end of the external light blocking part is exposed on a surface of the base, and the other end of the external light blocking part is buried in the base. The one end has a shape of a stripe and the other end has a shape of a zigzag curve when viewed from the front. Furthermore, a method of fabricating an external light blocking film and a filter for a display device having an external light blocking film are provided. The external light blocking film has an excellent ability to absorb external light. A complicated pattern of the external light blocking film can be easily formed without additional machining processes, whereby the fabrication time and cost can be saved.

17 Claims, 7 Drawing Sheets

EXTERNAL LIGHT BLOCKING FILM FOR DISPLAY DEVICE AND FILTER HAVING THE SAME

CROSS-REFERENCE TO RELATED APPLICATION

This application claims the benefit of Korean Patent Application No. 10-2007-0111196 filed on Nov. 1, 2007 with the Korean Intellectual Property Office, the disclosure of which is incorporated herein by reference.

BACKGROUND OF THE INVENTION

1. Field of the Invention

The present invention relates to an external light blocking film, a method of fabricating the same and a filter having the same. Particularly, the present invention relates to an external light blocking film which can improve a Bright Room Contrast Ratio (BRCR), luminance and viewing angle and can be easily fabricated to save the fabrication time and cost.

2. Description of the Related Art

Display devices include televisions, monitors of personal computers, portable display devices, and so on. Display devices are recently getting larger sized and thinner.

Accordingly, flat panel display (FPD) devices such as plasma display panel (PDP) devices, liquid crystal display (LCD) devices, field emission display (FED) devices, and organic light emitting display (OLED) devices take the place of cathode ray tube (CRT) device, which was representative of display devices.

Hereinafter, PDP devices and a filter therefor will be exemplified but the present invention is not limited thereto. For example, a filter according to the present invention can be used for large sized display devices such as OLED devices, LCD devices and FED devices; small sized display devices such as Personal Digital Assistance (PDA) devices, display devices for small sized games, display devices for small mobile phones; and flexible display devices.

Especially, a PDP device is in the limelight since it has excellent display characteristics such as high luminance, a high contrast ratio, low after-image, and a wide viewing angle.

A PDP device causes gas discharge between electrodes by applying a direct or alternating voltage to the electrodes, then a fluorescent material is irradiated with ultraviolet rays caused by the gas discharge to be activated, and thereby light is generated. A PDP device displays images by using the generated light.

However, a PDP device has drawbacks that a large amount of electromagnetic waves and near infrared rays is emitted due to its intrinsic characteristics. The electromagnetic waves and near infrared rays emitted from a PDP device may have a harmful effect to the human body, and cause malfunction of precision appliances such as a cellular phone and a remote controller. Further, a PDP device has a high surface reflection and has lower color purity than a CRT device due to orange color light emitted from gas such as He or Xe.

Therefore, a PDP device employs a PDP filter in order to block electromagnetic waves and near infrared rays, reduce light reflection, and improve color purity. The PDP filter is installed in front of a panel assembly. The PDP filter is generally fabricated by adhering or bonding together a plurality of functional layers such as an electromagnetic shielding layer, etc.

In addition, in order to improve a Bright Room Contrast Ratio and luminance, the PDP filter includes an external light blocking film to block external light entering from the outside and absorb external light reflected by the panel assembly.

The external light blocking film includes a micro pattern in the shape of stripes. The external light blocking film causes a moiré pattern due to interference with a stripe pattern of boundaries between cells of the panel assembly, when installed in front of the panel assembly. Image quality deteriorates due to the moiré pattern caused by interference between a shadow created when the external light blocking film having the micro pattern is exposed to external light and the stripe pattern of the panel assembly.

Since it is impossible to remove the stripe pattern of the panel assembly, in order to remove the moiré pattern, a pitch of the stripes of the external light blocking film should be much smaller or larger than a pitch of the stripes of the panel assembly or the stripes of the external light blocking film should be inclined at some angle.

However, if the pitch of the stripes of the external light blocking film increases, an ability to block external light decreases. In addition, it is difficult to fabricate the external light blocking film with a narrow pitch stripe pattern. On the other hand, the inclined stripes lower an ability to block external light and increase consumption of a film.

One of major problems in fabricating the external light blocking film is to prepare a template. A machined template of metal is usually used to form a micro pattern. However, a machining process of fabricating the metal template has a problem in that the fabrication cost is high and the fabrication time is long. In addition, the machined metal template can form only a simple pattern such as a stripe pattern. In addition, the conventional external light blocking film has a problem in that the stripe pattern thereof causes the moiré pattern to make image quality worse, as mentioned above.

SUMMARY OF THE INVENTION

The present invention is intended to solve the foregoing problems with the conventional art. An object of the present invention is to provide an external light blocking film having a pattern of curves to efficiently block external light and prevent a moiré phenomenon.

Another object of the present invention is to provide a filter having the external light blocking film.

Still another object of the present invention is to provide an external light blocking film whose complicated pattern can be easily formed without a machining process.

In order to achieve the above-mentioned objects, the present invention provides an external light blocking film including a base of transparent resin and an external light blocking pattern having a plurality of external light blocking parts formed at the base and filled with a light absorption material, wherein one end of the external light blocking part has a different shape from the other end of the external light blocking part. For example, the one end can have a stripe shape and the other end can have a zigzag curved shape.

Typically, the one end is exposed on a surface of the base and the other end is buried in the base.

Preferably, an amplitude of the zigzag curved shape is 100 μm or less and a wavelength thereof is 400 μm or less.

Preferably, the zigzag curved shape is a shape of a sine wave, that is, a sinusoidal shape. Here, it should be noted that the "sine wave" does not limited to an exact sine wave but includes all curves which wave along a predetermined direction and have wavelengths in a predetermined range.

A section of the external light blocking part can have a shape of a wedge, a trapezoid, a rectangle, a semicircle or a "U". The section of the external light blocking part can have a single kind of shape. The external light blocking parts whose sections have different kinds of shape from each other can be used together to form a single external light blocking pattern. That is, it is possible that a section of one external light blocking part has a trapezoidal shape and a section of another external light blocking part has a rectangular shape. Adjacent external light blocking parts can also have sections of different shapes.

Typically, the one end has a larger width than the other end.

A difference between a refraction index of the external light blocking part and a refraction index of the base can be given 0.5 or less. In case that a refraction index of the external light blocking part is lower than a refraction index of the base, the difference can be in the range of 0.01 to 0.5. When the difference is in the range of 0.01 to 0.5, the external light blocking film makes an image entering from a panel assembly totally reflected to improve efficiency of emitting the image and at the same time, improves efficiency of absorbing external light. Here, the external light blocking film blocks external light by absorption rather than reflection.

The base can include at least one colorant which selectively absorbs light with a predetermined wavelength. A color compensation colorant, a near infrared ray absorbing colorant, a neon light cut colorant, etc can be used as the colorant. The colorant can be at least one of a cyanine type colorant, an anthraquinone type colorant, a naphthoquinone type colorant, a phthalocyanine type colorant, a naphthalocyanine type colorant, a diimmonium type colorant, nickel dithiol type colorant, an azo type colorant, a stryl type colorant and a methine type colorant. The external light blocking film containing the colorants can perform a color compensation function and a near infrared ray blocking function as well as an external light blocking function.

Furthermore, the present invention provides a method of fabricating an external light blocking film, the method including: a template preparation step of preparing a template of resin having a pattern; a swelling step of applying a first resin on the template, curing the first resin, and then separating the cured first resin from the template to transform the pattern of the template; a base forming step of forming a pattern on a base by using the swelled template; and a filling step of filling the pattern of the base with a light absorbing material.

An ultraviolet curable resin can be used as the first resin and the resin forming the base, but the present invention is not limited thereto. For example, a thermosetting resin can also be used as the first resin and the resin forming the base. The first resin and the resin forming the base can be of the same kind or different kinds.

Typically, a first mold preparation step of preparing a first mold is followed by the template preparation step. In the template preparation step, an embossed pattern is formed on the template by using the first mold with the intaglio pattern and in the base forming step, an intaglio pattern is formed on the base by using the swelled template.

The swelling step can be performed five to twenty times. Here, the resins used in respective swelling steps can be of the same kind or different kinds. If the number of repetitions of the swelling steps is lower than five, the template is hardly transformed. If the number of repetitions is more than twenty, economical efficiency and reliability of the template is not good. However, it should be noted that the transformation degree of the template can be affected by composition of the first resin as well as the number of repetitions of the swelling steps.

Preferably, the template is made of a removable resin such as a silicone based resin. The removable resin has high removability and thus is easy to remove. The removable resin can be polydimethylsiloxane (PDMS). However, the present invention is not limited thereto. Various polymer resins with good removability can be used.

Preferably, the first resin is an ultraviolet resin which includes at least one monomer selected from the group consisting of alky acrylate, ethyl acrylate and butyl acrylate.

A filter according to the present invention can be used for a PDP device, an OLED device, an LCD device, a FED device, etc. The filter is installed in front of a panel assembly.

The one end of the external light blocking part can face the panel assembly and the other end can face a viewer. However, the present invention is not limited thereto.

The external light blocking film according to the present invention can improve the efficiency of blocking external light and prevent a moiré phenomenon to improve image quality.

According to the present invention, a complicated pattern can be easily formed by using a transformation of the polymer template, not a metal template made through a machining process. The present invention does not require a machining process which requires a long process time and thus enables the fabrication time and cost to decrease.

The filter according to the present invention can perform multiple functions such as a color compensation function, a near infrared ray blocking function as well as an external light blocking function. Accordingly, the present invention is economical and efficient. The filter according to the present invention can improve the efficiency of blocking external light and prevent a moiré phenomenon to improve image quality.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE
EXEMPLARY EMBODIMENT

The present invention will now be described more fully hereinafter with reference to the accompanying drawings, in which exemplary embodiments thereof are shown.

Although not shown, a PDP device according to the present invention includes a case; a cover covering the case; a driving circuit board housed in the case; a panel assembly including light emitting cells in which gas discharge occurs and a fluorescent layer; and a PDP filter. The light emitting cell contains a discharge gas. For example, a Ne—Xe based gas, a He—Xe based gas and the like can be used as the discharge gas. The panel assembly emits light in a similar way to a fluorescent lamp. Gas discharge occurs in the light emitting cells and then ultraviolet rays emitted from the discharge gas activate the fluorescent layer in the panel assembly to produce visible light.

The PDP filter is arranged in front of the panel assembly. The PDP filter can be installed apart from the display panel or in contact with the display panel. The PDP filter can adhere to or bond with a front substrate of the panel assembly by an adhesive or a bonding agent in order to prevent dust from sticking thereto or reinforce the strength of the filter.

The filter can include an electromagnetic shielding layer made of a material with high conductivity. The electromagnetic shielding layer is grounded through the cover to the case. Accordingly, before electromagnetic waves produced by the panel assembly reaches a viewer, it is discharged though the electromagnetic shielding layer and the cover to the case.

Figure 1:
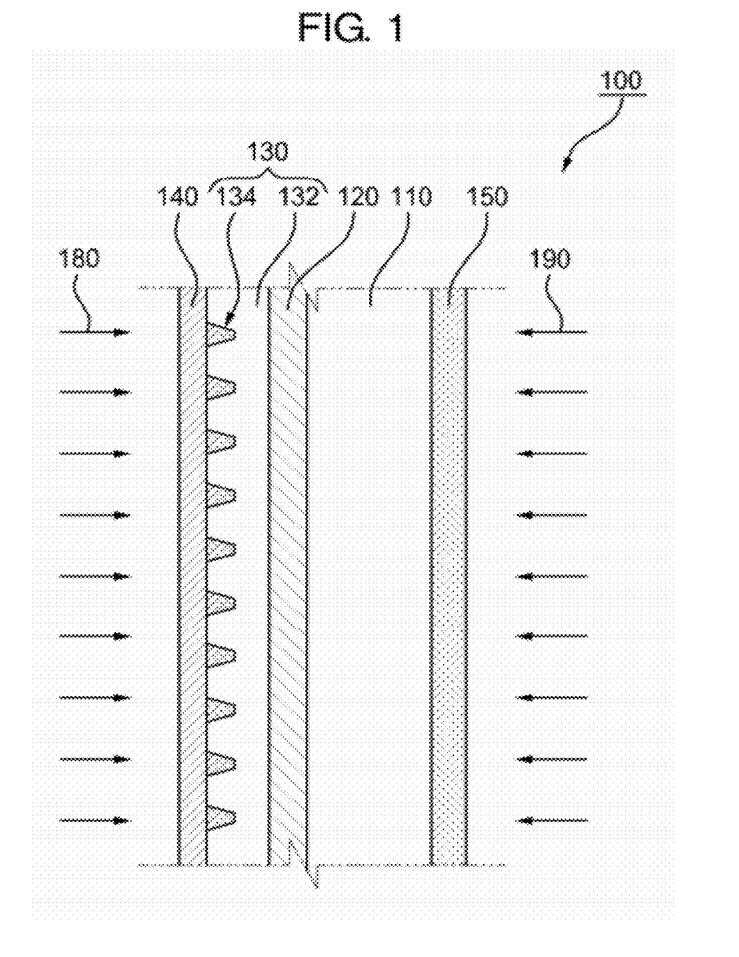
FIG. 1 is a cross-sectional view illustrating a filter for a display device.

FIG. 1 is a cross-sectional view illustrating a filter 100.

Referring to FIG. 1, the filter 100 includes a transparent substrate 110 and a variety of optical members formed on the transparent substrate 110. The optical members have a variety of blocking functions. Examples of the optical members are an electromagnetic shielding layer 120, an external light blocking film 130, a color compensation layer 140, an anti-reflection layer 150, etc.

The electromagnetic shielding layer 120, the external light blocking film and the color compensation layer 140 are arranged facing the panel assembly. The anti-reflection layer 150 is arranged on the other surface of the transparent substrate 110 onto which external light is incident.

However, the present invention is not limited thereto. The transparent substrate 110, the electromagnetic shielding layer 120, the external light blocking film 130, the color compensation layer 140, and the anti-reflection layer 150 can be layered in various orders. In addition, one layer can perform more than two functions at the same time.

The transparent substrate 110 can be made of inorganic materials such as glass, quartz, etc or transparent organic polymers. Examples of the transparent organic polymer are typically acryl or polycarbonate, but the present invention is not limited thereto. The transparent substrate 110 preferably has high transmittance and thermal resistance. A multi-layered polymer substrate can be used as the transparent substrate 110. The visible light transmittance of the transparent substrate 110 is preferably 80% or more. A glass transition temperature of the transparent substrate 110 is preferably 50☐ or more.

The substrate 110 of polymer is required to be transparent in the range of visible light. Considering the cost, thermal resistance and transmittance, polyethylene terephthalat (PET) is preferable as the material of the substrate 110. However, the present invention is not limited thereto. In some cases, the transparent substrate 110 can be excluded from the filter 100.

The anti-reflection layer 150 prevents external light 190 incident from a direction of a viewer from being reflected to the outside to improve a contrast ratio.

In this embodiment, the anti-reflection layer 150 is arranged on the other surface of the transparent substrate 110, but the present invention is not limited thereto. As shown in FIG. 1, the anti-reflection layer 150 is preferably formed on a surface of the substrate facing a viewer.

The electromagnetic shielding layer 120 blocks electromagnetic waves produced by the panel assembly. In order to block electromagnetic waves, the panel assembly has to be covered with a layer with high conductivity. The electromagnetic shielding layer 120 can include a conductive mesh film or a multilayered transparent conductive film in which a metal thin film and a high refractive transparent thin film are layered. Here, the conductive mesh film can include a grounded metal mesh, a metal coated synthetic resin mesh, or a metal coated metal fiber mesh. Various materials with good electrical conductivity and workability, for example, copper, chrome, nickel, silver, molybdenum, tungsten, aluminum, etc. can be used as a metal for the conductive mesh film.

The multilayered transparent conductive film can includes a high refractive transparent thin film represented by a film of Indium Tin Oxide (ITO) to block electromagnetic waves. The multilayered transparent conductive film can include a metal thin film of gold, silver, cooper, white gold, palladium or the like and a high refractive transparent thin film of indium oxide, tin dioxide, zinc oxide or the like, the metal thin film and the high refractive transparent thin film being alternately layered.

Although not shown, the filter 100 can further include a near infrared ray blocking layer. The near infrared ray blocking layer performs a function of blocking near infrared rays which is produced by the panel assembly and causes a malfunction of a mobile phone and a remote controller.

The multilayered transparent conductive film has a function of blocking near infrared rays. Accordingly, in case that the multilayered transparent conductive film is used as the electromagnetic shielding layer 120, the filter 100 can block near infrared rays as well as electromagnetic waves without a separate near infrared ray blocking layer. Of course, in this case, the filter 100 can also include a separate near infrared ray blocking layer.

The filter 100 can include the color compensation layer 140 which selectively absorbs light with a predetermined wavelength. The color compensation layer 140 can be arranged at one side of the transparent substrate 110 facing the panel assembly, but the present invention is not limited thereto. The color compensation layer 140 reduces or adjusts the amount of red color, green color or blue color to change or correct color balance, whereby the filter 100 can improve a color reproduction range and image quality.

The color compensation layer 140 can include a variety of colorants. The colorants can be a dye or a pigment. An organic colorant having a neon light cut function such as a cyanine type colorant, an anthraquinone type colorant, a phthalocyanine type colorant, an azo type colorant, a styrl type colorant and a methine type colorant can be used. A preferable kind and a concentration of the colorant depend on an absorption wavelength, an absorption coefficient, and desired transmittance characteristics and thus can be changed according to them.

Although not shown, the filter 100 can include a diffusion layer. The diffusion layer can prevent a moiré phenomenon or a Newton ring phenomenon which occurs due to interference between incident light and reflected light caused when a repeated pattern of the external light blocking film 130 or the electromagnetic shielding layer 120 is reflected by a front substrate of the panel assembly. The diffusion layer can be arranged at various positions, but it is preferable to arrange the diffusion layer on one surface of the filter 100 adjacent to the panel assembly. The diffusion layer can be included as a separate layer or it can be incorporated into another layer. The diffusion layer can be arranged between other layers. The diffusion layer can be provided in the form of an adhesive layer connecting the panel assembly and the filter 100 together in which particles with different refraction indices are contained.

The external light blocking film 130 includes a base 132 of transparent resin and an external light blocking pattern 134. The external light blocking pattern 134 is formed at the base 132 and includes a plurality of external light blocking parts. A section of the external light blocking part can have a trapezoidal shape, but the present invention is not limited thereto. For example, the section can have a wedge shape, a rectangular shape, a semicircular shape, a U shape or the like.

The external light blocking film 130 is arranged at the opposite side of the transparent substrate 110 to the anti-reflection layer 150. However, the present invention is not limited thereto. As long as the external light blocking film 130 can absorb external light 190 and transmit light 180 from the panel assembly well, it can be layered at various positions and in a different direction.

In this embodiment, a bottom surface of the external light blocking pattern 134 which is exposed on a surface of the base 132 and is even with the surface of the base 132 faces the panel assembly, but the present invention is not limited thereto. That is, the bottom surface can face a viewer or bottom surfaces can be exposed on both surfaces of the base 132.

The base 132 is a plate shaped support of a transparent material transmitting visible light. The base 132 can be made of glass, polyethylene terephthalate (PET), acryl, polycarbonate (PC), urethane acrylate, polyester, epoxy acrylate, brominate acrylate, polyvinyl chloride (PVC) or the like.

The external light blocking film 130 absorbs external light to prevent the external light from entering onto the panel assembly. In addition, the external light blocking film 130 totally reflects light from the panel assembly toward a viewer. Accordingly, it is possible to obtain high transmittance and contrast ratio. Furthermore, when the external light blocking pattern 134 is filled with a conductive material together with a light absorption material, the external light blocking film 130 can perform a function of blocking electromagnetic waves as well.

In case that the external light blocking pattern 134 is filled with a conductive material and thus can perform a function of blocking electromagnetic waves, the conductive film with the sheet resistance of 0.8 Ω/square or less in which a set of a metal thin film and a metal oxide thin film is layered one to three times can be used as the electromagnetic shielding layer 120. Although the conductive film according to the present invention includes the smaller number of layers than a conventional conductive film in which a set of a metal thin film and a metal oxide thin film is layered three to six times, it can sufficiently block electromagnetic waves.

FIG. 1 shows that the electromagnetic shielding layer 120, the anti-reflection layer 150 and the color compensation layer 140 are independently formed, but the present invention is not limited thereto. Especially, the external light blocking film 130 containing a conductive material as well as a light absorbing material performs a function of blocking electromagnetic waves as well as a function of blocking external light to supplement a function of the electromagnetic shielding layer 120. An electrode for grounding can be formed along both sides or the periphery of the external light blocking film 130 to electrically connect the external light blocking parts containing a conductive material together.

Hereinafter, referring to FIGS. 2 and 3, an external light blocking film 200 will be described in more detail in contrast with a conventional art.

Figure 2:
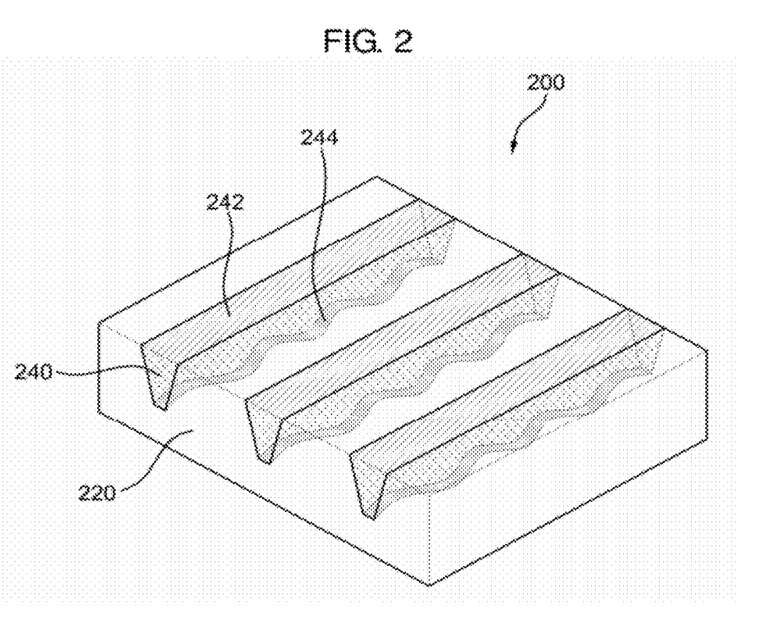
FIG. 2 is a perspective view illustrating an external light blocking film for a display device.
Figure 3:
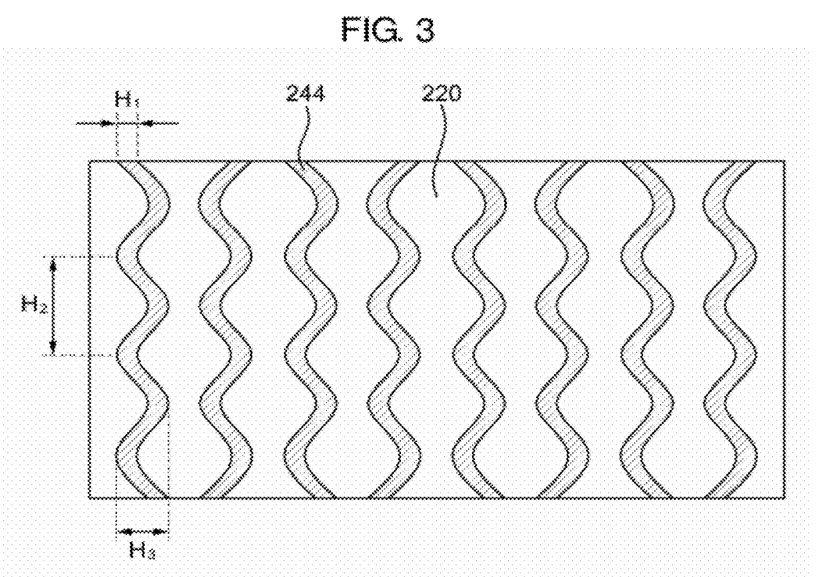
FIG. 3 is a front view illustrating the external light blocking film.

FIG. 2 is a cross-sectional view illustrating the external light blocking film 200 according to one embodiment of the present invention and FIG. 3 is a front view of the external light blocking film 200 in FIG. 2.

Referring to FIG. 2, the external light blocking film 200 includes a transparent base 220 and a plurality of external light blocking parts 240. The external light blocking part 240 is formed by filling a groove with a trapezoidal section with a light absorbing material. One end 242 of the external light blocking part 240 is exposed on a surface of the base 220 and the other end 244 is buried in the base 220. The one ends have a stripe pattern in which a plurality of stripes is arranged parallel with one another, when viewed from the rear direction.

Referring to FIG. 3, the other ends have a pattern in which a plurality of zigzag curves is arranged parallel with one another. However, shapes of the one end 242 and the other end 244 is not limited to a stripe and a zigzag curve and the one end 242 and the other end 244 can have other shapes.

The zigzag curve can be similar to a sinusoidal curve. The curves of the other ends can have different shapes from one another. That is, the curves of the respective external light blocking parts can have different wavelengths and amplitudes from one another. Here, the terms, "wavelength" and "amplitude" should be construed in a broad sense as meaning a length between repeated basic units of the curve and a length between a crest and a trough of the curve. The other end 244 with a zigzag curved shape preferably has amplitudes ($H_3$) of 100 μM or less and wavelengths ($H_2$) of 400 μm or less. If the amplitude is more than 100 μm, a haze increases. If the wavelength is more than 400 μm, moiré is difficult to prevent.

The amplitude and wavelength can be changed according to a depth of the external light blocking part 240, an angle between an inclined side surface and a bottom surface of the trapezoidal external light blocking part 240 and a width of the bottom surface of the external light blocking part 240. A width ($H_1$) of the zigzag curve can be in the range of 5~20 μm but the present invention is not limited thereto.

The width ($H_1$), wavelength ($H_2$) and amplitude ($H_3$) of the other end 244 can be varied in one external light blocking part 240. In addition, one external light blocking part can have a different width ($H_1$), wavelength ($H_2$) and amplitude ($H_3$) from another external light blocking part. The irregular pattern of the other end 244 enables a moiré phenomenon which occurs due to regular patterns to be prevented. The blocking effectiveness of the external light blocking film 200 depends on a geometric shape and a concentration of the light absorption material. Accordingly, the blocking effectiveness can be adjusted by changing the sectional shape and size of the external light blocking part 240; a distance between adjacent external light blocking parts; width of the one end 242; and width ($H_1$), wavelength ($H_2$) and amplitude ($H_3$) of the other end 244.

The stripes and zigzag curves of the external light blocking film 200 can be formed parallel with a short side or a long side of a screen of a display device or inclined at some angle to the short side or the long side.

Hereinafter, referring to FIGS. 4 and 5, a method of fabricating an external light blocking film will be described in more detail.

Figure 4:
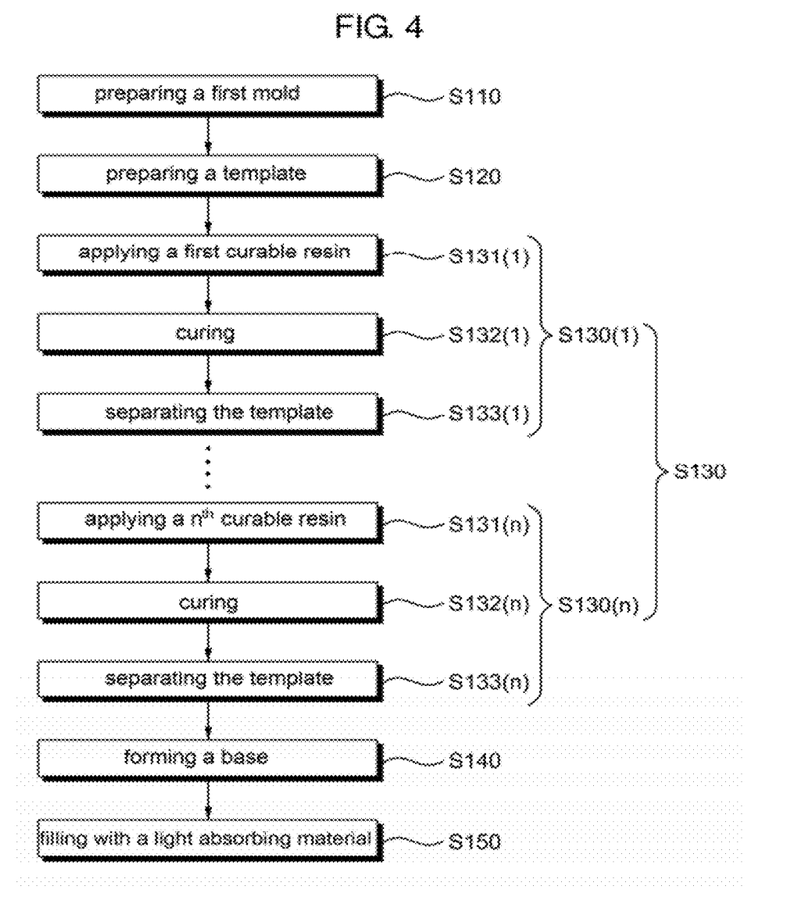
FIG. 4 is a flow chart illustrating a method of fabricating an external light blocking film.
Figure 5:
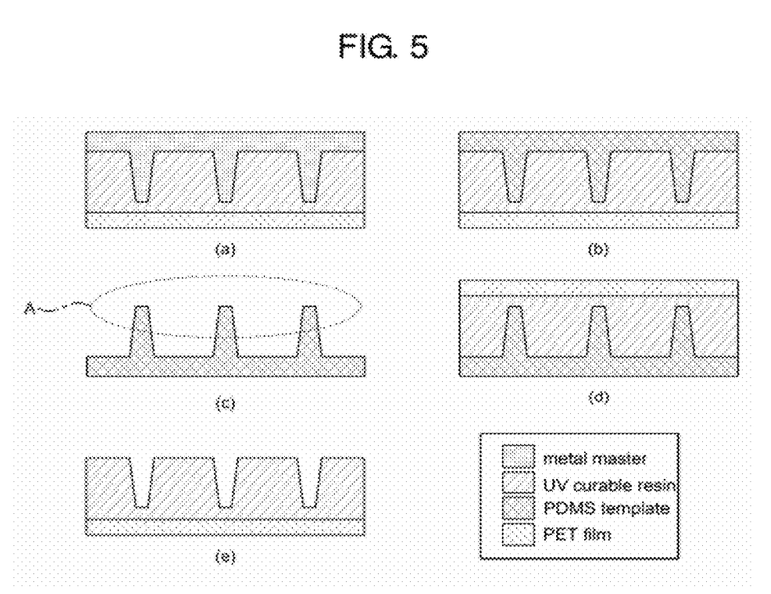
FIG. 5 is cross-sectional views for explaining the method of fabricating the external light blocking film.

FIG. 4 is a flow chart illustrating a method of fabricating an external light blocking film. FIG. 5 is a cross-sectional view for explaining the method of fabricating the external light blocking film.

Referring to FIG. 4, the method includes a first mold preparation step (S110), a template preparation step (S120), a swelling step (S130) of transforming the pattern of the template, a base forming step (S140) of forming a base with an intaglio pattern by using the swelled template, and a filling step (S150) of filling the intaglio pattern of the base with a light absorbing material. The swelling step (S130) can be performed one or more times. A first swelling step (S130(1)) can includes a step (131(1)) of applying a first resin on the template, a step (S132(1)) of curing the first resin and a step (S133(1)) of separating the cured first resin from the template. Likewise, an $n^{th}$ swelling step (S130(n)) can include a step (131(n)) of applying a first resin on the template, a step (S132(1)) of curing the first resin and a step (S133(1)) of separating the cured first resin from the template.

Hereinafter, referring to FIGS. 4 and 5, respective steps will be described in more detail.

First, a first mold with an intaglio pattern is fabricated by stamping a UV curable resin using a metal master and then curing the UV curable resin using ultraviolet rays. (S110) The metal master can be easily fabricated through a simple machining process since it has a trapezoidal section and a simple stripe pattern in which straight lines are arranged parallel with one another, as shown in FIG. 5 (a). However, the present invention is not limited thereto. For example, in the first mold preparation step, a master of other materials such as polymer resin can be substituted for the metal master.

Furthermore, the template can be fabricated by using only a metal master with an intaglio pattern, not using the first mold. Also, the template can be fabricated through a machining process or the like without using the metal master and the first mold.

Next, a removable resin such as PDMS is applied on the first mold and then is cured. (FIG. 5 (b))

A PDMS template with an embossed pattern is obtained by separating the removable resin from the first mold. (S120). As shown in FIG. 5 (c), the template has the embossed pattern, in which its section has a trapezoidal shape and straight lines are arranged parallel with one another.

Next, a first swelling step is performed. In the first swelling step, a UV curable resin is applied onto the PDMS template and is cured. (FIG. 5 (d)). For example, a first UV curable resin is applied onto a support such as a PET film and then the first UV curable resin is stamped using the PDMS template. Thereafter, the combination of the cured first UV curable resin and the PET film is separated from the PDMS template.

While the UV curable resin is on the PDMS template, an acrylate based monomer contained in the UV curable resin is absorbed into the PDMS template and as a result, the PDMS template is swelled due to solubility, compatibility or the like between the PDMS and the monomer. The swelling occurs when small molecules forming the UV curable resin, that is, the monomer is absorbed into the cross linked PDMS template. The swelling of the PDMS template due to the monomer and polymerization between the monomers absorbed into the PDMS template cause permanent transformation of the PDMS template. The monomer can be at least one of alkyl acrylate, ethyl acrylate and butyl acrylate. The monomer is compatible with the PDMS during a UV curing process. Since the UV curing process is an exothermic process, it is expected that the temperature of the polymer will increase by 10 degrees. Since the swelled PDMS template has an increased volume and as a result, is stressed, it can not keep its initial shape. As the swelling step is repeated, the degree of transformation becomes greater. In the first swelling step, the volume increase of the template is not sufficient to cause the transformation thereof and thus its initial shape can be kept. However, as the swelling step is repeated, the template continues to transform to have a pattern of zigzag curves.

The first swelling step is followed by the second swelling step to the $n^{th}$ swelling step. Here, "n" is a natural number of more than one.

As the number of repetitions of the swelling step increases, the degree of transformation of the template becomes greater. The amplitude of the transformed pattern of the template increases, but the wavelength thereof is kept unchanged. Because the template can not endure the stress caused by the volume increase, it is transformed. The weakest part of the template is transformed first, and continues to be transformed during succeeding swelling steps because the transformed part is still weakest. The transformation occurs because the PDMS template does not have a uniform mechanical property all over the area of the embossed pattern. That is, node parts (positioned at 90 degrees and 180 degrees in a sine wave) of the sinusoidal pattern are not relatively weak and thus is kept unchanged. Trough parts and crest parts are relatively weak and thus continue to be transformed. Accordingly, the wavelength can be kept unchanged but the amplitude continues to increase. Here, the wavelength means a distance between adjacent crests or adjacent troughs. One zigzag curve can have a uniform wavelength or non-uniform wavelengths. The amplitude means a distance between a crest and a trough adjacent to each other. Likewise, one zigzag curve can have a uniform amplitude or non-uniform amplitudes.

When a section of the external light blocking part has a shape of an isosceles trapezoid, a bottom part of the template having a broad width is hardly transformed, while a top part of the template having a narrow width is transformed to have a shape of a wave. The top part at which the transformation occurs is part 'A' in FIG. 5 (c).

Polymer has a worse chemical resistance than metal. By using such characteristics of polymer, the present invention provides the external light blocking film with a complicated pattern which is difficult to form using a metal template.

When a plurality of swelling steps is performed and the template is transformed to a desired level, the swelling step (S130) is finished and the total number of swelling steps reaches 'n'. That is, steps (c) and (d) in FIG. 5 are alternately repeated. More specifically, after the PDMS template is prepared ((c) in FIG. 5), a UV curable resin is applied onto the PDMS template and is cured ((d) in FIG. 5). The cured UV curable resin is separated from the PDMS template ((c) in FIG. 5) and then a UV curable resin is applied again onto the PDMS template and is cure ((d) in FIG. 5). Such steps are repeated.

When the template is sufficiently transformed, the transformed template is separated from the cured first UV curable resin and then a second curable resin is applied onto the finished template. Here, the finished template is used as a second mold. Thereafter, the template is separated from the cured second curable resin, whereby the base is formed. ((e) in FIG. 5) The base is transparent and has grooves thereon. The base forms a part of the external light blocking film. That is, the transparent base of the external light blocking film is formed by using the finished template as the second mold.

Although it is typical that a pattern of the base is formed using the swelled template, it is also possible that a step of forming a third mold, a fourth mold, and the like is further included between the swelling step and the base forming step, and a pattern of the base is formed using the molds.

After the transparent base is completed, a step of filling the intaglio pattern of the base with a light absorbing material follows. The intaglio pattern of the base is filled with a polymer resin containing a colorant such as carbon black using a wiping method. As a conductive material, a metal such as silver powder and silver paste can be included in the polymer resin. In addition, an additive such as a binder and an antifoam agent can be included in the polymer resin. It is preferable in terms of a contrast ratio that the polymer resin has a lower refraction index than the base, but the present invention is not limited thereto. For example, the polymer resin can have a higher refraction index or the same refraction index compared with the base.

Hereinafter, referring to FIGS. 6 to 8, the transformation of the template will be described in more detail.

Figure 6:
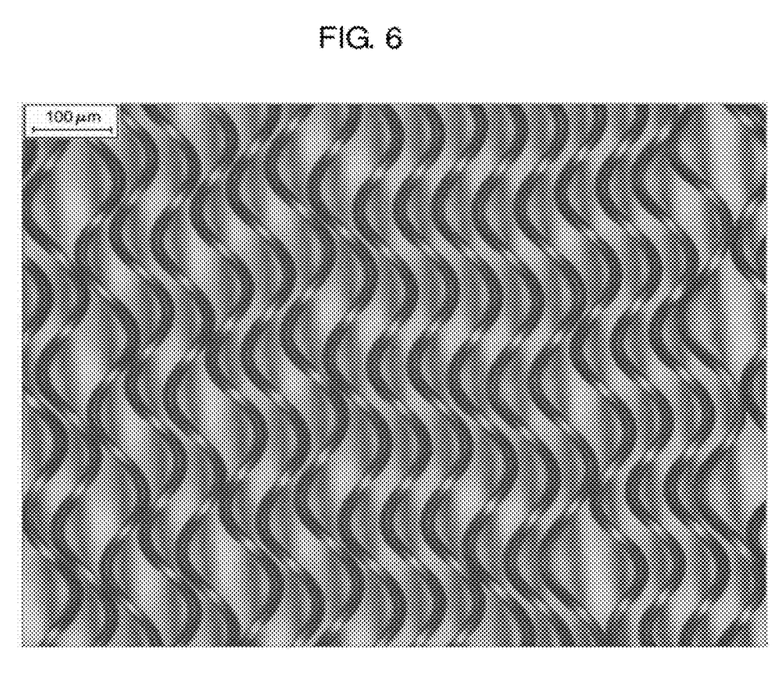
FIG. 6 is an optical microphotograph of a PDMS template.

FIG. 6 is an optical microphotograph of a PDMS template. A scale bar in the drawing represents 100 μm. The PDMS template was fabricated through sixteen swelling steps. Part 'A' in FIG. 5 (c) is depicted as curves in FIG. 6 and a bottom part at which the transformation hardly occurs is depicted as faint straight lines in FIG. 6. A transformed part has a shape of a zigzag curve similar to a sine wave, while a non-transformed part keeps its initial shape of a stripe. As shown in FIG. 6, nodes of respective zigzag curves can be irregularly positioned, which makes the pattern irregular.

Figure 7:
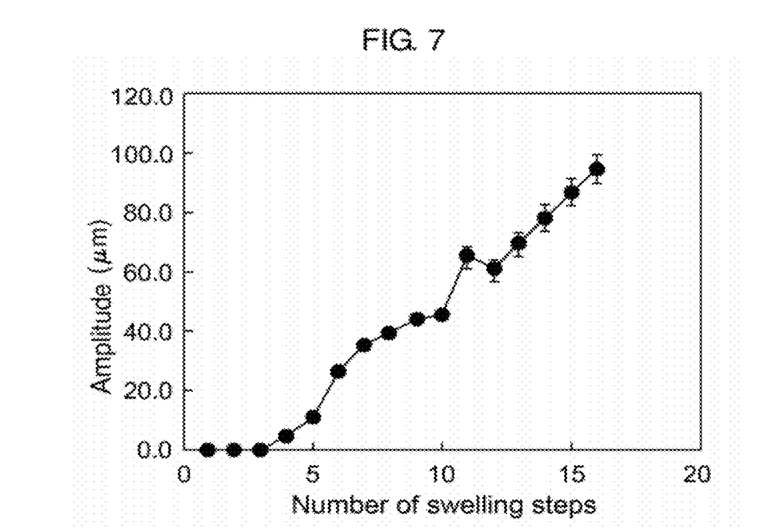
FIG. 7 is a graph illustrating a relationship between the number of swelling steps and an amplitude of a curve of a sine wave shape.

FIG. 7 is a graph illustrating a relationship between the number of swelling steps and amplitude of a curve with a sine wave shape. When the number of swelling steps is less than five, the degree of transformation is slight. When the number of swelling steps is more than five, an amplitude of a curve increase to 20 μm or more. When the number of swelling steps is more than twenty, economical efficiency and reliability of the template becomes worse due to excessive transformation.

Figure 8:
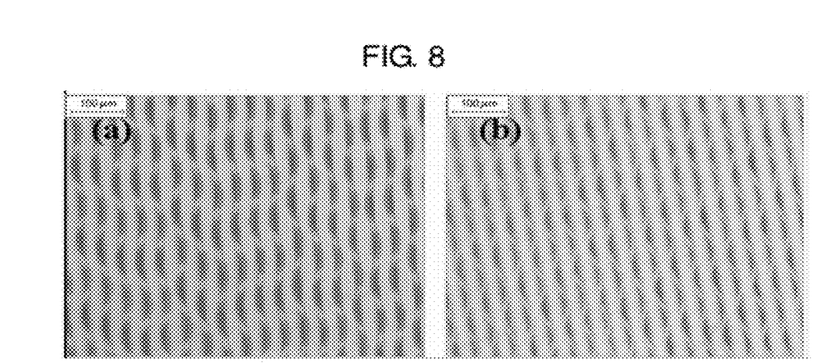
FIG. 8 is an optical microphotograph in which (a) illustrates a PDMS template with the width of 8 μm and (b) illustrates a PDMS template with the width of 13 μm.

FIG. 8 is an optical microphotograph in which (a) illustrates a PDMS template with the width ($H_1$ in FIG. 3) of 8 μm which underwent seven swelling steps and (b) illustrates a PDMS template with the width of 13 μm which underwent seven swelling steps. A scale bar in FIG. 8 represents 100 μm. A curve in FIG. 8 represents an embossed part of the template.

In case of (a) in which a width of the embossed part is relatively narrow, a wavelength of the transformed curve is 243±17 μm. In case of (b) in which a width of the embossed part is relatively broad, a wavelength of a transformed curve is 295±10 μm. Larger a width of the embossed part is, larger a wavelength of the sine wave is. This is because larger a width of the embossed part is, larger a critical stress which can cause the transformation is. As the swelling steps are repeated, the amplitude ($H_3$ in FIG. 3) increases but the wavelength ($H_2$ in FIG. 3) is kept unchanged. This is because deformation force required to deform the template in a perpendicular direction to the stripe is much smaller than deformation force required to deform the template in a parallel direction with the stripe.

What is claimed is:

1. An external light blocking film for a display device comprising:
   a base of transparent resin, and
   an external light blocking pattern comprising a plurality of external light blocking parts formed at the base and filled with a light absorption material,
   wherein one end of at least one of the plurality of external light blocking parts has a different shape from the other end of the at least one external light blocking part, and the one end has a shape of a stripe and the other end has a shape of a zigzag curve.

2. The external light blocking film of claim 1,
   wherein the one end is exposed on a surface of the base, and the other end is buried in the base.

3. The external light blocking film of claim 1,
   wherein the one end faces in a rear direction and the other end faces in a front direction.

4. The external light blocking film of claim 1,
   wherein a section of the external light blocking part has a shape of a wedge, a trapezoid, or a quadrangle.

5. The external light blocking film of claim 1, wherein the one end has a larger width than the other end.

6. The external light blocking film of claim 1,
   wherein an amplitude of the zigzag curve is 100 μm or less.

7. The external light blocking film of claim 1,
   wherein a wavelength of the zigzag curve is 400 μm or less.

8. The external light blocking film of claim 1,
   wherein the zigzag curved shape is a sinusoidal shape.

9. The external light blocking film of claim 1, wherein the other ends of the plurality of external light blocking parts vary in at least one of a width, a wavelength of the zigzag curve, or an amplitude of the zigzag curve.

10. The external light blocking film of claim 9, wherein the variation of the other ends of the plurality of external light blocking parts in the at least one of the width, the wavelength of the zigzag curve, or the amplitude of the zigzag curve prevents Moire phenomenon.

11. The external light blocking film of claim 9, wherein the variation of the at least one of the width, the wavelength of the zigzag curve, or the amplitude of the zigzag curve occurs at least within respective external light blocking parts of the plurality of external light blocking parts.

12. The external light blocking film of claim 9, wherein the variation of the at least one of the width, the wavelength of the zigzag curve, or the amplitude of the zigzag curve occurs at least between respective external light blocking parts of the plurality of light blocking parts.

13. A filter for a display device comprising an external light blocking film,
   wherein the external light blocking film comprises a base of transparent resin and an external light blocking pattern comprising a plurality of external light blocking parts formed at the base and filled with a light absorption material, and
   one end of at least one of the plurality of external light blocking parts has a different shape from the other end of the at least one external light blocking part, and the one end has a shape of a stripe and the other end has a shape of a zigzag curve.

14. The filter of claim 13, wherein the other ends of the plurality of external light blocking parts vary in at least one of a width, a wavelength of the zigzag curve, or an amplitude of the zigzag curve.

15. The filter of claim 14, wherein the variation of the other ends of the plurality of external light blocking parts in the at least one of the width, the wavelength of the zigzag curve, or the amplitude of the zigzag curve prevents Moire phenomenon.

16. The filter of claim 14, wherein the variation of the at least one of the width, the wavelength of the zigzag curve, or the amplitude of the zigzag curve occurs at least within respective external light blocking parts of the plurality of external light blocking parts.

17. The filter of claim 14, wherein the variation of the at least one of the width, the wavelength of the zigzag curve, or the amplitude of the zigzag curve occurs at least between respective external light blocking parts of the plurality of light blocking parts.

* * * * *